CARBOXYLIC ACID DERIVATIVES

Thomas Leigh, Jeffrey Meyrick Thorp, and Wilson Shaw Waring, Macclesfield, England, assignors to Imperial Chemical Industries Limited, London, England
No Drawing. Filed Mar. 15, 1967, Ser. No. 623,230
Claims priority, application Great Britain, Mar. 31, 1966, 14,264/66, 14,265/66
Int. Cl. C07c 65/00, 69/76
U.S. Cl. 260—473 G                     8 Claims

ABSTRACT OF THE DISCLOSURE

Biphenylyloxy- and biphenylylthio-alkanoic acid derivatives which lower the concentration of cholesterol and/or triglycerides in the blood serum and reduce the level of fibrinogen in blood plasma, and which possess anti-inflammatory activity. Pharmaceutical compositions containing such compounds and a method of using such compounds in the treatment of coronary artery disease and atherosclerosis.

---

This invention relates to new carboxylic acid derivatives which possess valuable therapeutic properties.

It is believed that certain diseases such as coronary artery disease and atherosclerosis in man are associated with an abnormally high concentration of triglycerides and/or cholesterol in the blood serum. We have now found that certain aryl derivatives of aliphatic acids reduce the concentration of cholesterol and/or triglycerides in the blood serum of rats, and also reduce the level of fibrinogen in the blood plasma of rats, and they are therefore considered to be useful in the treatment or prophylaxis in humans and animals of such diseases as coronary artery disease and atherosclerosis. The said derivatives also possess anti-inflammatory activity in rats, and are therefore considered to be useful in the treatment of inflammatory conditions such as rheumatoid arthritis in man.

According to the invention we provide new carboxylic acid derivatives of the formula:

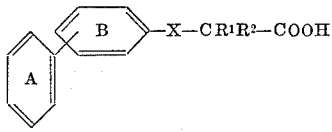

wherein $R^1$ stands for hydrogen and $R^2$ stands for an alkyl radical of at least 2 carbon atoms, or wherein $R^1$ and $R^2$, which may be the same or different, stand for alkyl radicals, wherein X stands for the oxygen or sulphur atom or for the sulphinyl (—SO—) or sulphonyl (—$SO_2$—) radical, and wherein at least one of the benzene rings A and B bears at least one substituent selected from halogen atoms and alkyl, alkoxy, halogenoalkyl and nitro radicals, and the esters and amides and salts thereof.

As suitable esters of the carboxylic acid derivatives of the invention there may be mentioned, for example, esters derived from a monohydric alcohol of the formula $R^3OH$, wherein $R^3$ stands for an alkyl, alkoxyalkyl, aminoalkyl, alkylaminoalkyl, dialkylaminoalkyl or alkyleneiminoalkyl radical, or esters derived from a polyhydric alcohol of the formula $$D—(OH)_n$$

wherein D stands for a straight- or branched-chain alkylene radical and $n$ is an integer from 2 up to the number of carbon atoms in the alkylene radical D, provided that not more than one hydroxyl radical is attached to any one carbon atom of the alkylene radical D.

As suitable amides of the carboxylic acid derivatives of the invention there may be mentioned, for example, amides derived from an amine of the formula $R^4R^5NH$, wherein $R^4$ and $R^5$, which may be the same or different, stand for hydrogen or for alkyl, alkoxyalkyl, aminoalkyl, alkylaminoalkyl, dialkylaminoalkyl, alkyleneiminoalkyl, carboxyalkyl or alkoxycarbonylalkyl radicals, or wherein $R^4$ and $R^5$ are joined together with the adjacent nitrogen atom to form a heterocyclic radical.

As a suitable value for $R^1$, $R^2$, $R^3$, $R^4$ or $R^5$ when it stands for an alkyl radical, or as a suitable value for the alkyl radical which may be a substituent in ring A or ring B, there may be mentioned, for example, an alkyl radical of not more than 4 carbon atoms, for example the methyl, ethyl, n-propyl, isopropyl or n-butyl radical.

As a suitable value for the halogen atom which may be a substituent in ring A or ring B there may be mentioned, for example, the chlorine or bromine atom.

As a suitable value for the alkoxy radical which may be a substituent in ring A or ring B there may be mentioned, for example, an alkoxy radical of not more than 4 carbon atoms, for example the methoxy or ethoxy radical.

As a suitable value for the halogenoalkyl radical which may be a substituent in ring A or ring B there may be mentioned, for example, an alkyl radical of not more than 4 carbon atoms which is substituted by one or more halogen atoms, for example fluorine, chlorine or bromine atoms. Thus a particular value for the halogenoalkyl radical which may be a substituent in ring A or ring B is, for example, the trifluoromethyl radical.

As a suitable value for $R^3$, $R^4$ or $R^5$ when it stands for an alkoxyalkyl, aminoalkyl, alkylaminoalkyl, dialkylaminoalkyl or alkyleneiminoalkyl radical there may be mentioned, for example, an alkyl radical of 2, 3 or 4 carbon atoms, for example the ethyl or propyl radical, which is substituted by an alkoxy radical of not more than 4 carbon atoms, for example the methoxy or ethoxy radical, or by an amino radical, or by an alkylamino radical of not more than 4 carbon atoms, for example the methylamino or ethylamino radical, or by a dialkylamino radical wherein neither alkyl part contains more than 4 carbon atoms, for example the dimethylamino or diethylamino radical, or by an alkyleneimino radical of not more than 6 carbon atoms, which may optionally be interrupted by an oxygen atom, for example the pyrrolidino, piperidino or morpholino radical. Thus, a particular value for $R^3$, $R^4$ or $R^5$ when it stands for an alkoxyalkyl, aminoalkyl, alkylaminoalkyl, dialkylaminoalkyl or alkyleneiminoalkyl radical is, for example, the $\beta$-ethoxyethyl, $\beta$-dimethylaminoethyl, $\beta$-diethylaminoethyl, $\gamma$-dimethylaminopropyl or $\beta$-morpholinoethyl radical.

As a suitable value for D there may be mentioned, for example, a straight- or branched-chain alkylene radical of not more than 6 carbon atoms, and as a suitable value for $n$ there may be mentioned, for example, an integer from 2 to 6. Particular polyhydric alcohols of the formula D—$(OH)_n$ are, for example, propylene-1,3-diol and glycerol. It is to be understood that not all the hydroxyl radicals attached to the alkylene radical D need be esterified by the carboxylic acids of the invention.

As a suitable value for $R^4$ or $R^5$ when it stands for a carboxyalkyl or alkoxycarbonylalkyl radical there may be mentioned, for example, an alkyl radical of not more than 4 carbon atoms which is substituted by a carboxy radical or by an alkoxycarbonyl radical of not more than 5 carbon atoms, for example the methoxycarbonyl or ethoxycarbonyl radical. Thus, a particular value for $R^4$ or $R^5$ when it stands for a carboxyalkyl or alkoxycarbonylalkyl radical is, for example, the carboxymethyl or ethoxycarbonylmethyl radical.

As a suitable value for the heterocyclic radical formed by R⁴, R⁵ and the adjacent nitrogen atom there may be mentioned, for example, a heterocyclic radical of not more than 7 ring atoms, for example the pyrrolidino-, piperidino, morpholino or hexamethyleneimino radical.

As suitable salts of the carboxylic acids of the invention, or of the amides thereof as defined above wherein R⁴ and/or R⁵ stands for a carboxyalkyl radical, there may be mentioned, for example, metal salts, for example alkali metal or alkaline earth metal salts, for example sodium, potassium, magnesium or calcium salts, or aluminium or bismuth salts, or ammonium salts.

A preferred group of new carboxylic acid derivatives of the invention comprises compounds of the formula:

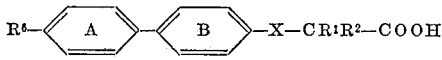

wherein R¹, R² and X have the meanings stated above, wherein R⁶ stands for a halogen atom or for an alkyl or halogenoalkyl radical, and wherein either or both of the benzene rings A and B may optionally be further substituted by one or more halogen atoms or alkyl or halogenoalkyl radicals, and the esters and amides and salts thereof.

Suitable values for the halogen, alkyl or halogenoalkyl substituent in, and for the esters and amides and salts of, the preferred group of carboxylic acids are those defined above.

Particular new carboxylic acid derivatives of the invention which fall within the scope of the preferred group of compounds are, for example, α-[4-(p-chlorophenyl)phenoxy]-α-methylpropionic acid and the salts thereof;
ethyl α-[4-(p-chlorophenyl)phenoxy]-α-methylpropionate;
methyl α-[4-(p-chlorophenyl)phenoxy]-α-methylpropionate;
α-[2-chloro-4-(p-ethylphenyl)phenoxy]-α-methylpropionic acid and the salts thereof;
α-[4-(p-bromophenyl)phenoxy]-α-methylpropionic acid and the salts thereof;
ethyl α-[4-(p-bromophenyl)phenoxy]-α-methylpropionate;
methyl α-[4-(p-bromophenyl)phenoxy]-α-methylpropionate;
α-[4-(p-chlorophenyl)phenylthio]-α-methylpropionic acid and the salts thereof;
methyl α-[4-(p-chlorophenyl)phenylthio]-α-methylpropionate;
α-[4-(p-chlorophenyl)phenoxy]butyric acid and the salts thereof;
α-[4-(p-chlorophenyl)phenoxy]-α-methylbutyric acid and the salts thereof;
α-[4-(p-chlorophenyl)phenylsulphinyl]-α-methylpropionic acid and the salts thereof;
α-[4-(p-chlorophenyl)phenylsulphonyl]-α-methylpropionic acid and the salts thereof;
α-[4-(p-chlorophenyl)phenoxy]-αmethylpropionamide;
N,N-dimethyl-α-[4-(p-chlorophenyl)phenoxy]-α-methylpropionamide;
N-methyl-α-[4-(p-chlorophenyl)phenoxy]-α-methylpropionamide;
N-methoxycarbonylmethyl-α-[4-(p-chlorophenyl)phenoxy]-α-methylpropionamide;
N-carboxymethyl-α-[4-(p-chlorophenyl)phenoxy]-α-methylpropionamide and the salts thereof;
di-O-{α-[4-(p-chlorophenyl)phenoxy]-α-methylpropionyl}propane-1,3-diol;
β-ethoxyethyl α-[4-(p-chlorophenyl)phenoxy]-α-methylpropionate;
α-[4-(p-ethylphenyl)phenoxy]-α-methylpropionic acid and the salts thereof;
β-diethylaminoethyl α-[4-(p-chlorophenyl)phenoxy]-α-methylpropionate;
β-dimethylaminoethyl α-[4-(p-chlorophenyl)phenoxy]-α-methylpropionate;
N-γ-dimethylaminopropyl-α-[4-(p-chlorophenyl)phenoxy]-α-methylpropionamide;
N-β-morpholinoethyl-α-[4-(p-chlorophenyl)phenoxy]-α-methylpropionamide;
N,N-tetramethylene-α-[4-(p-chlorophenyl)phenoxy]-α-methylpropionamide, and
α-[4-(p-trifluoromethylphenyl)phenoxy]-α-methylpropionic acid and the salts thereof.

Other particular new carboxylic acids of the invention are, for example

α-[2-chloro-6-phenylphenoxy]-α-methylpropionic acid and the salts thereof;
α-[2-chloro-4-phenylphenoxy]-α-methylpropionic acid and the salts thereof;
methyl α-[2-chloro-4-phenylphenoxy]-α-methylpropionate;
α-[4-(p-nitrophenyl)phenoxy]-α-methylpropionic acid and the salts thereof;
α-[4-(p-methoxyphenyl)phenoxy]-α-methylpropionic acid and the salts thereof;
methyl α-[4-(p-methoxyphenyl)phenoxy]-α-methylpropionate and
α-[4-chloro-3-phenylphenoxy]-α-methylpropionamide.

According to a further feature of the invention we provide a process for the manufacture of those of the carboxylic acid derivatives of the invention and the esters and amides and salts thereof wherein X stands for the oxygen or sulphur atom, which comprises the interaction of a metal derivative of a compound of the formula:

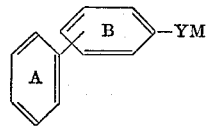

wherein A and B have the meanings stated above, wherein Y stands for the oxygen or sulphur atom and wherein M stands for a metal atom, with a carboxylic acid of the formula:

$$Z—CR^1R^2COOH$$

wherein R¹ and R² have the meanings stated above and wherein Z stands for a halogen atom, or with an ester or amide or salt thereof.

As a suitable metal atom M there may be mentioned, for example, an alkali metal atom, for example the sodium atom.

As a suitable value for the halogen atom Z there may be mentioned, for example, the chlorine, bromine or iodine atom.

The process may be carried out in a diluent or solvent, for example benzene, toluene, xylene, ethanol or dimethylformamide, and it may be carried out at ambient temperature or it may be accelerated or completed by the application of heat.

It is to be understood that when the carboxylic acid itself, or an amide thereof as defined above wherein R⁴ and/or R⁵ stands for a carboxyalkyl radical, is used as starting material then a sufficient excess of the metal derivative starting material must be used to neutralise all the carboxyl groups in the first-mentioned starting material.

According to a further feature of the invention we provide a process for the manufacture of those of the carboxylic acid derivatives of the invention and the salts thereof wherein X stands for the oxygen or sulphur atom, which comprises the interaction of a compound of the formula:

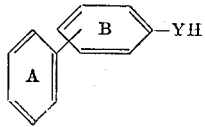

wherein A, B and Y have the meanings stated above, with a carbonyl derivative of the formula $R^1COR^2$, wherein $R^1$ and $R^2$ have the meanings stated above, in the presence of a tri- or tetrahalogenated methane derivative and a strong base.

The tri- or tetra-halogenated methane derivative may be, for example, chloroform, bromoform, iodoform, carbon tetrachloride or carbon tetrabromide. A preferred derivative is chloroform.

The strong base may be, for example, an alkali metal hydroxide, for example sodium hydroxide or potassium hydroxide, which preferably is used in the solid form.

The interaction may be carried out in a diluent or solvent, for example in an excess of the carbonyl reagent of the formula $R^1COR^2$, wherein $R^1$ and $R^2$ have the meanings stated above, and it may be accelerated or completed by the application of heat.

According to a further feature of the invention we provide a process for the manufacture of those of the carboxylic acid derivatives of the invention, and the esters and amides and salts thereof, wherein X stands for, respectively, the sulphinyl or sulphonyl radical, which comprises the oxidation of the corresponding carboxylic acid derivative of the invention or an ester or amide or salt thereof, wherein X stands for, respectively, the sulphur atom, or the sulphur atom or the sulphinyl radical.

The oxidation of the sulphur derivatives to the sulphinyl derivatives may be carried out using a peroxide, for example hydrogen peroxide, as oxidising agent, and it may be carried out in a diluent or solvent, for example aqueous acetic acid.

The oxidation of the sulphur or sulphinyl derivatives to the sulphonyl derivatives may be carried out using an alkali metal permanganate, for example potassium permanganate, and it may be carried out in a diluent or solvent, for example aqueous acetic acid.

The carboxylic acid derivatives of the invention may be converted into the esters or amides or salts thereof by conventional means, and the esters of the carboxylic acid derivatives may be converted into the amides of the carboxylic acid derivatives by conventional means. Alternatively, the esters or amides of the carboxylic acid derivatives may be hydrolysed to the carboxylic acid derivatives therselves by conventional means, and those of the carboxylic acid amides as defined above wherein $R^4$ and/or $R^5$ stands for an alkoxycarbonylalkyl radical may be converted into the corresponding amides wherein $R^4$ and/or $R^5$ stands for a carboxyalkyl radical by hydrolysis.

Thus, according to a further feature of the invention we provide a process for the manufacture of the esters or amides of the carboxylic acid derivatives of the invention as defined above which comprises the interaction of an activated derivative of a carboxylic acid derivative of the invention with an alcohol of the formula $R^3OH$ or $D$—$(OH)_n$, wherein $R^3$, D and $n$ have the meaning, stated above, or with an amine of the formula $R^4R^5NH$, wherein $R^4$ and $R^5$ have the meanings stated above.

A suitable activated derivative of the carboxylic acid derivative of the invention is, for example, an acid halide, for example the acid chloride, or an acid anhydride. The last-mentioned interaction may be carried out in a diluent or solvent, for example tetrahydrofuran or benzene, and it may be carried out at ambient temperature or it may be accelerated or completed by the application of heat, for example by heating to the boiling point of the diluent or solvent. The interaction may also be accelerated by the presence of a basic catalyst, for example N,N-dimethylaniline or pyridine.

According to a further feature of the invention we provide pharmaceutical compositions which comprise as active ingredient at least one of the new carboxylic acid derivatives of the invention, or an ester or amide or salt thereof, in association with a pharmaceutically-acceptable diluent or carrier therefor.

The pharmaceutical compositions may be formulated so as to be suitable for oral administration. For such purposes the active ingredient may be mixed with suitable known pharmaceutical excipients and incorporated by known means into such formulations as tablets, capsules, aqueous or oily suspensions, emulsions, aqueous or oily solutions, dispersible powders, syrups or elixirs.

Formulation of the compositions of the invention as tablets, which may be coated and which may be either effervescent or non-effervescent, may be carried out according to the known art. Inert diluents or carriers, for example magnesium carbonate or lactose, are used together with conventional disintegrating agents, for example maize starch and alginic acid, and lubricating agents, for example magnesium stearate.

Liquid or solid formulations may be filled into capsules for oral administration. Active ingredients which are liquids may be dissolved in oils of vegetable or animal origin, for example sunflower seed oil, maize oil or cod-liver oil, and may contain additional ingredients, for example anti-oxidants such as the tocopherols or wheat germ oil. Solid formulations suitable for filling into capsules may contain the solid active ingredient in admixture with solid materials which have a buffering action, for example colloidal aluminium hydroxide or calcium hydrogen phosphate. Alternatively, the liquid or solid active ingredient alone may be encased in a capsule carrier in order to provide the active ingredient in a unit dosage form.

Active ingredients which are sparingly soluble in water may be formulated as suspensions either in an aqueous base or in an emulsion base. Aqueous based suspensions are prepared with the aid of wetting agents, for example polyethyleneoxide condensation products of alkyl phenols, fatty alcohols or fatty acids, and suspending agents, for example hydrophilic colloids such as polyvinylpyrrolidone. Emulsion-based suspensions are prepared by suspending the active ingredient with the aid of wetting agents and suspending agents in the emulsion base, which is prepared with the aid of emulsifying agents such as those described below. The suspension formulations may in addition contain sweetening agents, flavouring agents, colouring materials, preservatives and anti-oxidants.

Active ingredients which are liquids at ordinary temperatures may be formulated as emulsions wherein the active ingredient itself or a solution of the active ingredient in an orally-acceptable oil, for example maize oil or cod liver oil, constitutes the oil phase. The solvent oil may itself be of use in the treatment of atherosclerosis, for example sunflower seed oil. Emulsions are prepared with the aid of emulsifying agents, examples of which are sorbitan tri-oleate, polyoxyethylene sorbitan mono-oleate, lecithin, gum acacia and gum tragacanth. The emulsions may contain in addition preservatives, antioxidants, flavouring and sweetening agents and colouring materials.

Compositions of the invention may also be in the form of a nutritive preparation in which the active ingredient is mixed with proteins and carbohydrates, for example casein.

The compositions described above may in addition contain dietary supplements, for example vitamins, for example the tocopherols; salts of glycerophosphoric acid; choline and inositol, the combination of which is known to be effective in reducing serum cholesterol levels; amino acids, for example methionine which has a liptotropic action similar to choline; and hormones or hormone extracts which may be useful in the treatment of conditions associated with old age.

The compositions of the invention may also additionally contain a steroid derivative, for example an androstane derivative, for example androsterone or its acetate or propionate.

Syrups or elixirs suitable for oral administration may be prepared from water soluble salts and may advantageously contain glycerol and ethyl alcohol as solvents or preservatives. They may in addition contain sweetening agents and flavouring agents, for example essential oils and colouring materials.

The compositions of the invention which are used in the treatment of inflammatory conditions may also additionally contain one or more known agents having anti-inflammatory and/or analgesic activity, for example acetylsalicylic acid, phenylbutazone, chloroquine, codeine or paracetomol.

As indicated above the compositions of the invention are considered to be useful in the treatment of coronary artery disease and atherosclerosis, and also in the treatment of inflammatory conditions such as rheumatoid arthritis. It is expected that the compositions will generally be administered orally in the form of capsules containing between about 0.01 and 0.5 g. of liquid or solid active ingredient or in the form of tablets, either effervescent or non-effervescent, containing between about 0.01 and 0.5 g. of solid active ingredient, these compositions being administered such that a patient undergoing treatment receives between 0.01 g. and 0.5 g. of active ingredient per day.

The invention is illustrated but not limited by the following examples in which the parts are by weight:

EXAMPLE 1

2.5 parts of sodium hydride are added to a stirred mixture of 20.4 parts of 4-(p-chlorophenyl)phenol and 300 parts of dimethylformamide and the mixture is stirred at ambient temperature for two hours. 25 parts of ethyl α-bromo-α-methylpropionate are added and the mixture is stirred at ambient temperature for a further twelve hours. The mixture is evaporated to dryness under reduced pressure, the residue is poured into water and the mixture is extracted with ether. The ethereal solution is separated, washed with dilute aqueous sodium hydroxide solution and evaporated to dryness. To the residue are added 50 parts of ethanol, 10 parts of water and 3 parts of potassium hydroxide and the mixture is heated under reflux for two hours and then evaporated to dryness under reduced pressure. The residue is dissolved in water and the solution is washed with ether. The aqueous solution is acidified with hydrochloric acid and the mixture is filtered. The solid residue is crystallised from ethanol and there is thus obtained α-[4-(p-chlorophenyl)phenoxy]-α-methylpropionic acid, M.P. 189–190° C.

The abovementioned acid is converted into its ethyl ester by conventional means and there is thus obtained ethyl α-[4-(p-chlorophenyl)phenoxy]-α-methylpropionate, M.P. 44° C.

The abovementioned acid is converted into its methyl ester by conventional means and there is thus obtained methyl α-[4-(p-chlorophenyl)phenoxy]-α-methylpropionate, M.P. 90° C.

EXAMPLE 2

30 parts of 2-chloro-6-phenylphenol are dissolved in a solution of 3.45 parts of sodium in 100 parts of ethanol, 29 parts of ethyl α-bromo-α-methylpropionate are added and the mixture is heated under reflux for 4 hours. The mixture is cooled and filtered, and the filtrate is evaporated to dryness under reduced pressure. The residue is dissolved in a solution of 25 parts of potassium hydroxide in a mixture of 25 parts of water and 150 parts of ethanol, and the mixture is heated under reflux for 2 hours. The mixture is cooled and filtered, and the solid residue of the potassium salt of the desired product is suspended in water and the suspension is acidified with 20% aqueous hydrochloric acid. The mixture is filtered, and the solid residue is crystallised from methanol containing dilute aqueous hydrochloric acid. There is thus obtained α-[2-chloro-6-phenylphenoxy]-α-methylpropionic acid, M.P. 134–135° C.

EXAMPLE 3

A mixture of 40 parts of 2-chloro-4-(p-ethylphenyl)phenol, 40 parts of sodium hydroxide and 950 parts of acetone is stirred and heated under reflux. 4.5 parts of chloroform are added, the mixture is heated under reflux for 15 minutes, and a further 21 parts of chloroform are added during 15 minutes at such at rate that the mixture continues to boil gently. The mixture is stirred and heated under reflux for a further 4 hours, and is then cooled and evaporated to dryness under reduced pressure. The residue is dissolved in 1500 parts of water and the solution is acidified with concentrated aqueous hydrochloric acid. The mixture is cooled and filtered and the solid residue is dried and crystallised from benzene. There is thus obtained α-[2-chloro-4-(p-ethylphenyl)phenoxy]-α-methylpropionic acid, M.P. 145–146° C.

EXAMPLE 4

The process described in Example 3 is repeated except that the 40 parts of 2-chloro-4-(p-ethylphenyl)phenol are replaced by an equivalent amount of the appropriate phenol starting material. There are thus obtained the acids described in the following table. These acids are converted into the methyl or ethyl esters thereof by conventional means and there are thus obtained the esters described in the following table.

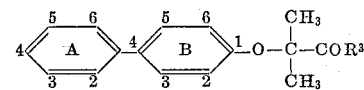

| Substituent in ring— | | | |
| --- | --- | --- | --- |
| A | B | R₃ | M.P. (° C.) |
| 4-Cl | | OH | 189–190 |
| 4-Br | | OH | 198–199 |
| 4-Br | | OCH₃ | 101 |
| 4-Br | | OC₂H₅ | 67 |
| | 2-Cl | OH | 109–111 |
| | 2-Cl | OCH₃ | (¹) |
| 4-NO₂ | | OH | 185 |
| 4-CH₃O | | OH | 137–139 |
| 4-CH₃O | | OCH₃ | 89 |

¹ B.P. 162° C./0.3 mm.

EXAMPLE 5

The process described in Example 3 is repeated except that the 40 parts of 2-chloro-4-(p-ethylphenyl)phenol are replaced by 38 parts of 4-(p-chlorophenyl)thiophenol. There is thus obtained α-[4-(p-chlorophenyl)phenylthio]-α-methylpropionic acid, M.P. 129–130° C.

The abovementioned acid is converted into its methyl ester by conventional means and there is thus obtained methyl α-[4-(p-chlorophenyl)phenylthio]-α-methylpropionate, B.P. 166° C./0.1 mm.

The 4-(p-chlorophenyl)thiophenol used as starting material may be obtained as follows:

23.5 parts of chlorosulphonic acid are added during 20 minutes to a stirred solution of 18.9 parts of 4-chlorobiphenyl in 150 parts of chloroform which is maintained at a temperature of between −2° C. and +1° C. The solution is stirred for a further one hour at ambient temperature and is then poured into 100 parts of crushed ice. The mixture is shaken and the organic layer is separated, washed with water, dried and evaporated to dryness under reduced pressure. The solid residue is crystallised from cyclohexane and there is thus obtained 4-(p-chlorophenyl)benzenesulphonyl chloride, M.P. 104–106° C.

A mixture of 250 parts of stannous chloride dihydrate and 1,000 parts of glacial acetic acid is stirred and saturated with gaseous hydrogen chloride at a temperature of 25–30° C. The resulting solution is heated to 80° C. and 28.8 parts of 4-(p-chlorophenyl)benzenesulphonyl chloride are added during 5 minutes, the temperature rising to 90° C. The solution is heated at 85–90° C. for a further 30 minutes and is then cooled and poured into 900 parts of concentrated aqueous hydrochloric acid. The mixture is filtered and the solid is washed free of acid, dried and crystallised from cyclohexane. There is thus obtained 4-(p-chlorophenyl)thiophenol, M.P. 150–151° C.

EXAMPLE 6

A mixture of 15 parts of 4-chloro-3-phenylphenol, 17.2 parts of sodium hydroxide and 280 parts of acetone is stirred and heated under reflux. 1 part of chloroform is added, the mixture is heated under reflux for 15 minutes, and a further 10 parts of chloroform are added during 15 minutes at such a rate that the mixture continues to boil gently. The mixture is stirred and heated under reflux for a further 4 hours, and is then cooled and evaporated to dryness under reduced pressure. The residue is dissolved in 400 parts of water and the solution is acidified with concentrated aqueous hydrochloric acid. The mixture is extracted twice with 75 parts of chloroform each time and the combined extracts are washed with water, treated wtih charcoal and filtered. The filtrate is stirred for 1 hour with a solution of 15 parts of sodium hydrogen carbonate in 500 parts of water and the aqueous layer is separated and acidified with concentrated aqueous hydrochloric acid. The mixture is extracted twice with 75 parts of chloroform each time and the combined extracts are dried and evaporated to dryness under reduced pressure. To the residual oil are added 40 parts of thionyl chloride and the solution is heated under reflux for 15 minutes. Excess of thionyl chloride is removed by evaporation under reduced pressure and the residue is dissolved in 40 parts of benzene. The solution is added during 15 minutes to 45 parts of concentrated aqueous ammonia solution which is maintained at a temperature of 10–20° C. The mixture is stirred for 1 hour at ambient temperature and the benzene layer is then separated, washed with water, dried and evaporated to dryness under reduced pressure. The solid residue is crystallised from cyclohexane and there is thus obtained α-(4-chloro-3-phenylphenoxy)-α-methylpropionamide, M.P. 119–120° C.

The 4-chloro-3-phenylphenol used as starting material may be obtained as follows:

A mixture of 84 parts of 4-amino-3-nitroanisole, 800 parts of water and 150 parts of concentrated aqueous hydrochloric acid is stirred and heated at 90–95° C. for one hour. The resulting red suspension is cooled and a solution of 35 parts of sodium nitrite in 100 parts of water is added during 30 minutes, the temperature being maintained at a temperature of between 3 and 5° C. The mixture is stirred for a further 30 minutes at 3–5° C. and is then filtered through a filteraid and added during 15 minutes to a stirred solution of 100 parts of cuprous chloride in 710 parts of concentrated aqueous hydrochloric acid which is maintained at a temperature of between 10 and 15° C. The mixture is stirred for a further one hour at 10–15° C., and is then kept for 18 hours at ambient temperature. The solid mixture is filtered and the solid is washed with water and dried. There is thus obtained 4-chloro-3-nitroanisole, M.P. 40–42° C.

18 parts of concentrated aqueous hydrochloric acid are added to a stirred mixture of 40 parts of iron-filings. 100 parts of water and 27 parts of 4-chloro-3-nitroanisole, the temperature rising slowly to 40° C. 5 further portions of 18 parts of concentrated aqueous hydrochloric acid are added at intervals so that the temperature of the mixture remains at between 40 and 45° C. The mixture is heated at 90–95° C. for 30 minutes and is then cooled and made alkaline with sodium carbonate. The mixture is steam distilled until 1500 parts of distillate have been collected. The distillate is extracted twice with 200 parts of ether each time and the combined ethereal extracts are dried and saturated with gaseous hydrogen chloride. The mixture is filtered and the solid is dried. There is thus obtained 3-amino-4-chloroanisole hydrochloride, M.P. 211° C. with decomposition. A solution of 14.2 parts of sodium nitrite in 25 parts of water is added during 30 minutes to a stirred mixture of 38.8 parts of 3-amino-4-chloroanisole hydrochloride, 40 parts of water and 23.5 parts of concentrated aqueous hydrochloric acid which is maintained at a temperature of 3–5° C. The solution is stirred for a further 15 minutes at 3–5° C. and is then added to 400 parts of cold benzene. The mixture is stirred vigorously at a temperature of 5–10° C. and a solution of 24 parts of sodium hydroxide in 120 parts of water is added during 15 minutes. The mixture is stirred for 2 hours at 5–10° C., and then for 18 hours at ambient temperature. The benzene layer is separated, washed with water and evaporated to dryness under reduced pressure. The residue is distilled under reduced pressure and there is thus obtained 4-chloro-3-phenylanisole, B.P. 120° C./0.3 mm.

A mixture of 26 parts of 4-chloro-3-phenylanisole and 80 parts of pyridine hydrochloride which has previously been dried for 1 hour at 140° C./25 mm. is heated under reflux for 1 hour and is then poured into 1,000 parts of cold dilute aqueous hydrochloric acid. The mixture is extracted twice with 300 parts of chloroform each time, and the combined extracts are dried and evaporated to dryness under reduced pressure. The residue is distilled under reduced pressure and there is thus obtained 4-chloro-3-phenylphenol, B.P. 127° C./0.1 mm.

EXAMPLE 7

41 parts of 4-(p-chlorophenyl)phenol are added portionwise during 30 minutes to a stirred suspension of 25 parts of a 50% dispersion of sodium hydride in oil (from which the oil has been washed with ether) in 950 parts of dimethylformamide which is maintained at a temperature of 20–25° C. The mixture is stirred for one hour at ambient temperature, and a solution of 33.4 parts of α-bromobutyric acid in 45 parts of dimethylformamide is added during 30 minutes, the temperature of the mixture being maintained at 15–25° C. The mixture is stirred for 18 hours at ambient temperature, and the solvent is then removed by evaporation under reduced pressure. The solid residue is suspended in 3,000 parts of hot water and the mixture is acidified with concentrated aqueous hydrochloric acid. The mixture is filtered and the solid residue is dried and crystallised from ethanol. There is thus obtained α-[4-(p-chlorophenyl)phenoxy]butyric acid, M.P. 155° C.

EXAMPLE 8

The process described in Example 1 is repeated except that 27 parts of ethyl α-bromo-α-methylbutyrate are used as starting material in place of the 25 parts of ethyl α-bromo-α methylpropionate. There is thus obtained α-[4-(p-chlorophenyl)phenoxy]-α-methylbutyric acid, M.P. 168° C.

EXAMPLE 9

1.8 parts of 30% aqueous hydrogen peroxide solution are added slowly to a stirred solution of 4.5 parts of α-[4-(p-chlorophenyl)-phenylthio]-α-methylpropionic acid in 100 parts of glacial acetic acid. The solution is stirred for 30 minutes and then kept for 18 hours at ambient temperature. The solution is concentrated to one-fifth of its original volume by evaporation under reduced pressure at a temperature of 40–50° C., and the mixture is then cooled and filtered. The solid residue is dried and crystallised from methanol. There is thus obtained α-[4-(p-chlorophenyl)phenylsulphinyl]-α-methylpropionic acid, M.P. 134° C. with decomposition.

EXAMPLE 10

A solution of 4 parts of potassium permanganate in 100 parts if water is added during 40 minutes to a stirred solution of 2.8 parts of α-[4-(p-chlorophenyl)phenylthio]-α-methylpropionic acid in 100 parts of glacial acetic acid which is maintained at a temperature of 20–30° C. The mixture is stirred for a further 1 hour at ambient temperature, and gaseous sulphur dioxide is then bubbled through the mixture at a temperature of 10–15° C. until all manganese dioxide has dissolved. The mixture is filtered and the solid is dried and dissolved in 20 parts of aqueous 5% sodium bicarbonate solution. The solution is treated with charcoal, filtered through a filteraid and the filtrate is acidified with concentrated aqueous hydrochloric acid. The mixture is filtered and the solid is dried and crystallised twice from benzene. There is thus obtained α-[4-(p-chlorophenyl)phenylsulphonyl] - α - methylpropionic acid, M.P. 199° C.

EXAMPLE 11

A mixture of 1.4 parts of methyl α-[4-(p-chlorophenyl)phenoxy]-α-methylpropionate and 13.5 parts of concentrated aqueous ammonia is heated in a sealed tube at 150° C. for 2 hours. The mixture is cooled and filtered and the solid is dried and crystallised from ethanol. There is thus obtained α-[4-(p-chlorophenyl)phenoxy]-α-methylpropionamide, M.P. 171° C.

EXAMPLE 12

A mixture of 6 parts of α-[4-p-chlorophenyl)phenoxy]-α-methylpropionic acid and 24 parts of thionyl chloride is heated under reflux for 15 minutes. The solution is evaporated to dryness under reduced pressure and the solid residue is dissolved in 15 parts of benzene. The solution is added dropwise to 20 parts of ice-cold 40% aqueous dimethylamine solution and the mixture is stirred for 1 hour at ambient temperature. The benzene layer is separated, washed with water, dried and evaporated to dryness. The solid residue is crystallised from petroleum ether, (B.P. 60–80° C.) and there is thus obtained N,N-dimethyl - α - [4-(p-chlorophenyl)phenoxy]-α-methylpropionamide, M.P. 78° C.

In a similar manner, using 40% aqueous methylamine solution in place of 40% aqueous dimethylamine solution, there is obtained N-methyl-α-[4-p-chlorophenyl)phenoxy]-α-methylpropionamide, M.P. 149° C.

EXAMPLE 13

A mixture of 7.7 parts of α-[4-(p-chlorophenyl)phenoxy]-α-methylpropionic acid and 30 parts of thionyl chloride is heated under reflux for 15 minutes. The solution is evaporated to dryness under reduced pressure and the residue is dissolved in 20 parts of benzene. The solution is added dropwise to a stirred mixture of 4 parts of methyl glycinate hydrochloride, 40 parts of benzene and 50 parts of 5% aqueous sodium bicarbonate solution which is maintained at 10–20° C. The mixture is stirred for a further 1 hour at ambient temperature, and the benzene layer is separated, washed with dilute aqueous hydrochloric acid and then with water, dried and evaporated to dryness under reduced pressure. The solid residue is crystallised from cyclohexane and there is thus obtained N - methoxycarbonylmethyl - α - [4-(p-chlorophenyl)phenoxy]-α-methylpropionamide, M.P. 96° C.

EXAMPLE 14

A mixture of 5 parts of α-[4-(p-chlorophenyl)phenoxy]-α-methylpropionic acid and 20 parts of thionyl chloride is heated under reflux for 15 minutes. The solution is evaporated to dryness under reduced pressure and the residue is dissolved in 20 parts of benzene. The solution is evaporated to dryness under reduced pressure and the residue is dissolved in 30 parts of tetrahydrofuran. The solution is added to a solution of 0.66 part of propane-1,3-diol and 1.6 parts of N,N-dimethylaniline in 50 parts of tetrahydrofuran and the mixture is heated under reflux for 2 hours and then evaporated to dryness under reduced pressure. The residual syrup is dissolved in ether and the ethereal solution is washed successively with dilute aqueous hydrochloric acid, dilute aqueous sodium hydroxide solution and water, dried over potassium carbonate and evaporated to dryness. The residual oil is stirred with petroleum ether (B.P. 40–60° C.) and the mixture is filtered. The solid is dried and crystallised twice from cyclohexane. There is thus obtained di-O-{α-[4-(p-chlorophenyl)phenoxy] - α-methylpropionyl}-propane-1,3-diol, M.P. 93° C.

EXAMPLE 15

5.8 parts of α-[4-(p-chlorophenyl)phenoxy]-α-methylpropionic acid are added to a solution of 4 parts of sodium carbonate in 100 parts of water, and the solution is boiled for 5 minutes. The solution is stirred and a solution of 6 parts of aluminum chloride hexahydrate in 50 parts of water is added slowly. The mixture is stirred for a further 10 minutes and is then filtered. The solid is washed twice with 50 parts of boiling water each time, and is then dried at 70° C. in vacuo over phosphorus pentoxide for 24 hours. There is thus obtained aluminum dihydroxide mono - α-[4-(p-chlorophenyl)phenoxy]-α-methylpropionate monohydrate.

EXAMPLE 16

A stirred suspension of 10 parts of α-[4-(p-chlorophenyl)phenoxyl-α-methylpropionic acid in 650 parts of water is titrated with aqueous 0.5 N-sodium hydroxide solution until the mixture is neutral. The solution is filtered through a filteraid and the filtrate is evaporated to dryness under reduced pressure. The solid residue is dried at 100° C. in vacuo over phosphorus pentoxide for 24 hours. There is thus obtained sodium α-[4-(p-chlorophenyl)phenoxy]-α-methylpropionate hemihydrate.

EXAMPLE 17

A 5% aqueous solution of calcium chloride is added to a solution of sodium α-[4-(p-chlorophenyl)phenoxy]-α-methylpropionate in water, prepared as described in Example 16, until precipitation of solid is complete. The mixture is filtered and the solid residue is washed with water and dried at 100° C. in vacuo over phosphorus pentoxide for 24 hours. There is thus obtained calcium di-α-[4-(p-chlorophenyl)phenoxy]-α-methylpropionate.

EXAMPLE 18

1.3 parts of aqueous 2 N-sodium hydroxide solution are added to a solution of 0.85 part of N-methoxycarbonylmethyl-α-[4-(p-chlorophenyl)phenoxy] - α - methylpropionamide in 12 parts of methanol and the solution is stirred for 15 minutes at ambient temperature and is then added to 50 parts of water. The mixture is acidified with concentrated hydrochloric acid, the temperature of the mixture being maintained at 10–15° C. The mixture is filtered and the solid residue is dried and crystallised from benzene. There is thus obtained N-carboxymethyl-α-[4-(p-chlorophenyl)phenoxy] - α - methylpropionamide, M.P. 160–161° C.

EXAMPLE 19

A mixture of 2.5 parts of α-[4-(p-chlorophenyl)phenoxy]-α-methylpropionic acid and 11.6 parts of thionyl chloride is heated under reflux for 15 minutes. The mixture is evaporated to dryness under reduced pressure and the residue is dissolved in 20 parts of benzene. This solution is evaporated to dryness under reduced pressure, and to the solid residue is added a solution of 0.81 part of β-ethoxyethanol in 25 parts of pyridine. The mixture is heated on the steam-bath for 30 minutes, and is then cooled and added to 200 parts of a mixture of ice and water. The mixture is extracted with 80 parts of benzene and the benzene extract is washed successively with aqueous 2 N-hydrochloric acid, aqueous 0.5 N-sodium hydroxide solution and water and dried. The solvent is removed by evaporation under reduced pressure and the residual oil is distilled under reduced pressure. There is thus obtained β-ethoxyethyl α-[4-(p-chlorophenyl)phenoxy]-α-methylpropionate, B.P. 180° C./0.1 mm.

EXAMPLE 20

The process described in Example 3 is repeated except that the 40 parts of 2-chloro-4-(p-ethylphenyl)phenol are replaced by 34 parts of 4-(p-ethylphenyl)phenol. There is thus obtained α-[4-(p-ethylphenyl)phenoxy]-α-methylpropionic acid, M.P. 131° C.

The 4-(p-ethylphenyl)phenol used as starting material may be obtained as follows.

A mixture of 167 parts of 4-acetyl-4'-methoxybiphenyl, 93 parts of sodium hydroxide, 1,650 parts of diethylene glycol and 95 parts of 85% hydrazine hydrate is stirred and heated under reflux for 1 hour. The solvent-condensing means are removed and the mixture is heated until sufficient water and hydrazine have been removed by evaporation to allow the temperature of the mixture to reach 205° C. The solvent-condensing means are replaced and the mixture is heated under reflux for a further 6 hours. The mixture is cooled and poured into 2,000 parts of water and the mixture thus obtained is acidified with concentrated hydrochloric acid. The mixture is filtered and the solid residue is washed with water, dried, and crystallised from benzene. There is thus obtained 4-(p-ethylphenyl)phenol, M.P. 151° C.

EXAMPLE 21

0.96 part of a 50% dispersion of sodium hydride in oil is added to a stirred solution of 2.9 parts of α-[4-(p-chlorophenyl)phenoxy]-α-methylpropionic acid in 25 parts of dry dimethylformamide which is maintained at a temperature of between 5° and 10° C. The mixture is allowed to warm to ambient temperature and then 1.7 parts of β-diethylaminoethyl chloride hydrochloride are added to the stirred mixture, the temperature being allowed to rise to 30° C. The mixture is heated at 95–100° C. for 20 hours, cooled and filtered, and the filtrate is evaporated to dryness under reduced pressure. The residue is washed with water and extracted with ether and the ethereal solution is extracted with 5% aqueous acetic acid solution. The acidic extract is made alkaline with aqueous ammonium hydroxide solution and the mixture is extracted with ether. The ethereal extract is washed with water, dried over sodium sulphate and filtered. Excess of ethereal hydrogen chloride solution is added to the filtrate, and the mixture is filtered. The solid residue is crystallised from acetone and there is thus obtained β-diethylaminoethyl α-[4-(p-chlorophenyl)phenoxy] - α - methylpropionate hydrochloride, M.P. 158–159° C.

The process described above is repeated except that an equivalent amount of β-dimethylaminoethyl chloride hydrochloride is used in place of the β-diethylaminoethyl chloride hydrochloride. There is thus obtained β-dimethylaminoethyl α-[4-(p-chlorophenyl)phenoxy]-α-methylpropionate hydrochloride, M.P. 150–152° C. (crystallised from acetone).

EXAMPLE 22

A mixture of 6 parts of α-[4-(p-chlorophenyl)phenoxy]-α-methylpropionic acid and 15 parts of thionyl chloride is heated at 95–100° C. for 15 minutes. The excess thionyl chloride is removed by distillation under reduced pressure and the solid residue of crude acid chloride is dissolved in 100 parts of dry ether. The ethereal solution is added gradually to a stirred solution of 4 parts of γ-dimethylaminopropylamine in 100 parts of dry ether at such a rate that the temperature of the mixture is maintained between 20° and 25° C. The mixture is stirred for 30 minutes and the ether is decanted from the precipitated solid. The ethereal solution is washed with water, and then extracted with excess of a 5% aqueous acetic acid solution. The acidic extract is made alkaline with aqueous ammonium hydroxide solution and extracted with ether. The ethereal extract is washed with water, dried over sodium sulphate, and filtered. Excess of a solution of oxalic acid in acetone is added to the filtrate and the mixture is filtered. The solid residue is washed with acetone and crystallised from methanol. There is thus obtained N-γ-dimethylaminopropyl - α - [4-(p-chlorophenyl)phenoxy]-α-methylpropionamide oxalate, M.P. 204–205° C. (with decomposition).

The process described above is repeated except that an equivalent amount of β-morpholinoethylamine is used in place of the γ-dimethylaminopropylamine. There is thus obtained N-β-morpholinoethyl-α-[4-(p-chlorophenyl)phenoxy]-α-methylpropionamide hydrochloride, M.P. 132–134° C. (crystallised from acetone).

EXAMPLE 23

A mixture of 2 parts of α-[4-(p-chlorophenyl)phenoxy]-α-methylpropionic acid and 5 parts of thionyl chloride is heated at 95–100° C. for 15 minutes. The excess thionyl chloride is removed by distillation under reduced pressure and the residue of crude acid chloride is dissolved in 25 parts of dry ether. The ethereal solution is added gradually to a solution of 2 parts of pyrrolidine in 25 parts of dry ether at such a rate that the temperature of the mixture is maintained between 20 and 25° C. The ethereal solution is decanted from the solid precipitate, washed with water, dried over sodium sulphate and filtered and the filtrate is evaporated to dryness. The residue is crystallised from petroleum ether (B.P. 60–80° C.) and there is thus obtained N,N-tetramethylene - α-[(p-chlorophenyl)phenoxy]-α-methylpropionamide, M.P. 118–119° C.

EXAMPLE 24

The process described in Example 3 is repeated except that the 40 parts of 2-chloro-4-(p-ethylphenyl)phenol are replaced by 40 parts of 4-(p-trifluoromethylphenyl)phenol. There is thus obtained α-[4-(p-trifluoromethylphenol)phenoxy]-α-methylpropionic acid, M.P. 184–185° C.

EXAMPLE 25

To a mixture of 1 part of ethyl α-[4-p-chlorophenyl)phenoxy]-α-methylpropionate and 33.7 parts of liquid paraffin are added 3 parts of gum acacia and 1.5 parts of gum tragacanth. To the thoroughly triturated mixture is added slowly with stirring a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of edible dyestuff in 110 parts of water. After the incorporation of a suitable flavouring agent, the mixture is homogenised by passage through a conventional homogeniser and there is thus obtained an emulsion suitable for oral administration for therapeutic purposes.

EXAMPLE 26

In a similar manner to that described in Example 25 but replacing the 33.7 parts of liquid paraffin by 30 parts of maize oil containing 0.01 part of propyl gallate, there is obtained an emulsion suitable for oral administration for therapeutic purposes.

EXAMPLE 27

5 parts of calcium α-[4-(p-chlorophenyl)phenoxy]-α-methylpropionate are added to a solution of 15 parts of calcium cyclamate, 2 parts of a condensation product of octylcresol with 8–10 molecular proportions of ethylene oxide, 3 parts of polyvinyl pyrrolidone and 0.9 part of methyl p-hydroxybenzoate in 500 parts of water. The mixture is ball-milled for several hours and after the incorporation of a suitable flavouring agent there is obtained a suspension suitable for oral administration for therapeutic purposes.

EXAMPLE 28

A mixture of 1 part of α-[4-(p-chlorophenyl)phenoxy]-α-methylpropionic acid, 40 parts of sucrose, 0.5 part of a cetyl alcohol polyethylene oxide condensate, 1 part of polyvinyl pyrrolidone, 0.25 part of methyl p-hydroxybenzoate and 100 parts of water is ball-milled for several hours. After the incorporation of suitable colouring and flavouring agents there is obtained a suspension suitable for oral administration for therapeutic purposes.

EXAMPLE 29

10 parts of sodium α-[4-(p-chlorophenyl)phenoxy]-α-methylpropionate are dissolved in a mixture of 83 parts of water, 250 parts of glycerol and 125 parts of ethyl alcohol. To the resultant solution is added a solution of 300 parts of sucrose in 150 parts of water. By the incorporation of a suitable flavouring agent and colouring matter, there is obtained a syrup suitable for oral administration for therapeutic purposes.

EXAMPLE 30

25 parts of sodium glycerophosphate, 25 parts of calcium glycerophosphate and 5 parts of calcium α-[4-(p-chlorophenyl)phenoxy]-α-methylpropionate are intimately mixed. The mixture is added gradually to 900 parts of soluble casein in a conventional mixer and mixing is continued until homogeneous. There is thus obtained a dietary supplement suitable for oral administration for therapeutic purposes.

EXAMPLE 31

An intimate mixture is prepared with conventional mixing equipment of 3 parts of pyridoxine hydrochloride, 100 parts of nicotinic acid, 100 parts of nicotinamide, 5 parts of methionine, 15 parts of choline bitartrate, 150 parts of ascorbic acid, 5 parts of calcium pantothenate, 10 parts of riboflavin and 50 parts of calcium α-[4-(p-chlorophenyl)phenoxy]-α-methylpropionate. The mixture is filled into capsules which are then suitable for oral administration for therapeutic purposes.

EXAMPLE 32

A mixture of 100 parts of calcium α-[4-(p-chlorophenyl)phenoxy]-α-methylpropionate, 94 parts of maize starch, 45 parts of alginic acid and 3.5 parts of magnesium stearate, is compressed into slugs which are then broken into granules. The granules are passed through an 8-mesh screen and 3.5 parts of magnesium stearate are added. The mixture is then compressed into tablets which are suitable for oral administration for therapeutic purposes.

EXAMPLE 33

A mixture of 1 part of sodium di-octyl sulphosuccinate dissolved in a sufficient quantity of methanol, 100 parts of calcium α-[4-(p-chlorophenyl)phenoxy] - α - methylpropionate, 75 parts of maize starch and 5 parts of alginic acid is granulated by admixture with a sufficient quantity of aqueous 10% maize starch paste. The granules are passed through a 12-mesh screen and dried at 50–55° C. The granules are then again passed through a 12-mesh screen and 6 parts of magnesium stearate are added and the mixture is compressed. There are thus obtained tablets suitable for oral administration for therapeutic purposes.

EXAMPLE 34

A mixture of 100 parts of sodium α-[4-(p-chlorophenyl)phenoxy]-α-methylpropionate, 50 parts of light magnesium carbonate and 10 parts of magnesium stearate is compressed into slugs. The slugs are broken into granules which are passed through an 8-mesh screen and compressed. There are thus obtained tablets suitable for oral administration for therapeutic purposes.

EXAMPLE 35

A mixture of 100 parts of sodium α-[4-(p-chlorophenyl)phenoxy]-α-methylpropionate and 50 parts of light magnesium carbonate is granulated by admixture with a solution of 2 parts of sodium di-octyl sulphosuccinate in a sufficient quantity of methanol. The granules are passed through a 12-mesh screen and dried at 50–55° C. The granules are then again passed through a 12-mesh screen and 8 parts of magnesium stearate are added and the mixture is compressed. There are thus obtained tablets suitable for oral administration for therapeutic purposes.

EXAMPLE 36

A mixture of 100 parts of α-[4-(p-chlorophenyl)phenoxy]-α-methylpropionic acid, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol; 3 parts of magnesium stearate are then added to the granules after which they are compressed to give tablets suitable for oral use for therapeutic purposes.

The α-[4-(p-chlorophenyl)phenoxy]-α-methylpropionic acid or the salts thereof used in any of the above Examples 27 to 36 may be replaced by an equal quantity of ethyl or methyl α-[4-(p-chlorophenyl)phenoxy]-α-methylpropionate, or of any other of the active ingredients hereinbefore described, and there are thus obtained in similar manner pharmaceutical compositions suitable for oral administration for therapeutic purposes.

EXAMPLE 37

A solution of 10 parts of methyl α-[4-(p-chlorophenyl)phenoxy]-α-methylpropionate in 190 parts of wheat germ oil is filled into soft gelatin capsules. There are thus obtained capsules suitable for oral administration for therapeutic purposes.

EXAMPLE 38

A solution of 10 parts of methyl α-[4-(p-chlorophenyl)phenoxy]-α-methylpropionate and 50 parts of ±α-tocopheryl acetate in 140 parts of maize oil is filled into soft gelatin capsules. There are thus obtained capsules suitable for oral administration for therapeutic purposes.

EXAMPLE 39

A mixture of 50 parts of methyl α-[4-(p-chlorophenyl)phenoxy]-α-methylpropionate, 203.5 parts of lactose, 9 parts of alginic acid, 15 parts of maize starch and 45 parts of a 10% aqueous solution of gelatin is granulated and passed through a 16-mesh screen. The granules are dried at 50–55° C. and passed through a 20-mesh screen, and 15 parts of maize starch and 3 parts of magnesium stearate are added. The mixture is then compressed into tablets which are suitable for oral administration for therapeutic purposes.

What we claim is:

1. A carboxylic acid derivative selected from compounds of the formula:

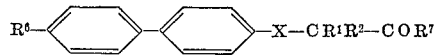

wherein $R^1$ and $R^2$ are alkyl of 1 to 4 carbon atoms; $R^6$ is chlorine or bromine; X is oxygen; and $R^7$ is selected from the group consisting of: hydroxy; alkoxy of 1 to 4 carbon atoms; alkoxy of 1 to 4 carbon atoms substituted by alkoxy of 1 to 4 carbon atoms or by dialkylamino wherein each alkyl is of 1 to 4 carbon atoms; pyrrolidino; β-morpholinoethylamino; dialkylamino wherein each alkyl is of 1 to 4 carbon atoms; monoalkylamino of 1 to 4 carbon atoms; and monoalkylamino of 1 to 4 carbon atoms wherein the alkyl is substituted by carboxy, by alkoxycarbonyl of 2 to 4 carbon atoms or by dialkylamino wherein each alkyl is of 1 to 4 carbon atoms; and the pharmaceutically-acceptable salts thereof.

2. A carboxylic acid derivative as claimed in claim 1 wherein $R^1$ is methyl and $R^2$ is methyl or ethyl; and $R^7$ is selected from the group consisting of hydroxy, methoxy, ethoxy, β-ethoxyethoxy, β-dimethylaminoethoxy, β-diethylaminoethoxy, pyrrolidino, β-morpholinoethylamino, dimethylamino, methylamino, carboxymethylamino, methoxycarbonylmethylamino and γ-dimethylaminopropylamino.

3. A carboxylic acid derivative as claimed in claim 2 wherein $R^1$ and $R^2$ are methyl and $R^6$ is chlorine.

4. A carboxylic acid derivative as claimed in claim 1 wherein $R^7$ is hydroxy.

5. A carboxylic acid derivative as claimed in claim 4 wherein $R^1$ is methyl and $R^2$ is methyl or ethyl.

6. α - [4-(p-chlorophenyl)phenoxy]-α-methylpropionic acid and pharmaceutically-acceptable salts thereof.

7. Ethyl α-[4-(p-chlorophenyl)phenoxy]-α-methylpropionate.

8. Methyl α-[4-(p-chlorophenyl)phenoxy]-α-methylpropionate.

References Cited

UNITED STATES PATENTS

| 3,364,249 | 1/1968 | Bolhofer | 260—520 X |
| 3,369,025 | 2/1968 | Bolhofer | 260—520 X |

FOREIGN PATENTS

| 916,242 | 1/1963 | Great Britain | 260—473 |
| 653,292 | 3/1965 | Belgium | 260—559 |

OTHER REFERENCES

Guss, Chem. Abstr. 48: 9956b (1954).
Buu-Hoi et al., Chem. Abstr. 53: 17961r (1959).

LORRAINE A. WEINBERGER, Primary Examiner

E. J. SKELLY, Assistant Examiner

U.S. Cl. X.R.

260—239 B, 247.1, 247.2 A, 247.7 C, 247.74, 293.4 R, 294 A, 294.7 A, 294.7 E, 326.3, 326.5 E, 326.5 S, 448 R, 470, 471 A, 501.17, 515 M, 516, 518 A, 518 R, 519, 520, 543 R, 558 S, 559 D, 575, 609 D, 612 R, 612 D, 620; 424—244, 248, 268, 274, 308, 309, 317, 324